April 23, 1935. W. VON NESSEN 1,998,645
DRIP COFFEEPOT
Filed March 21, 1934
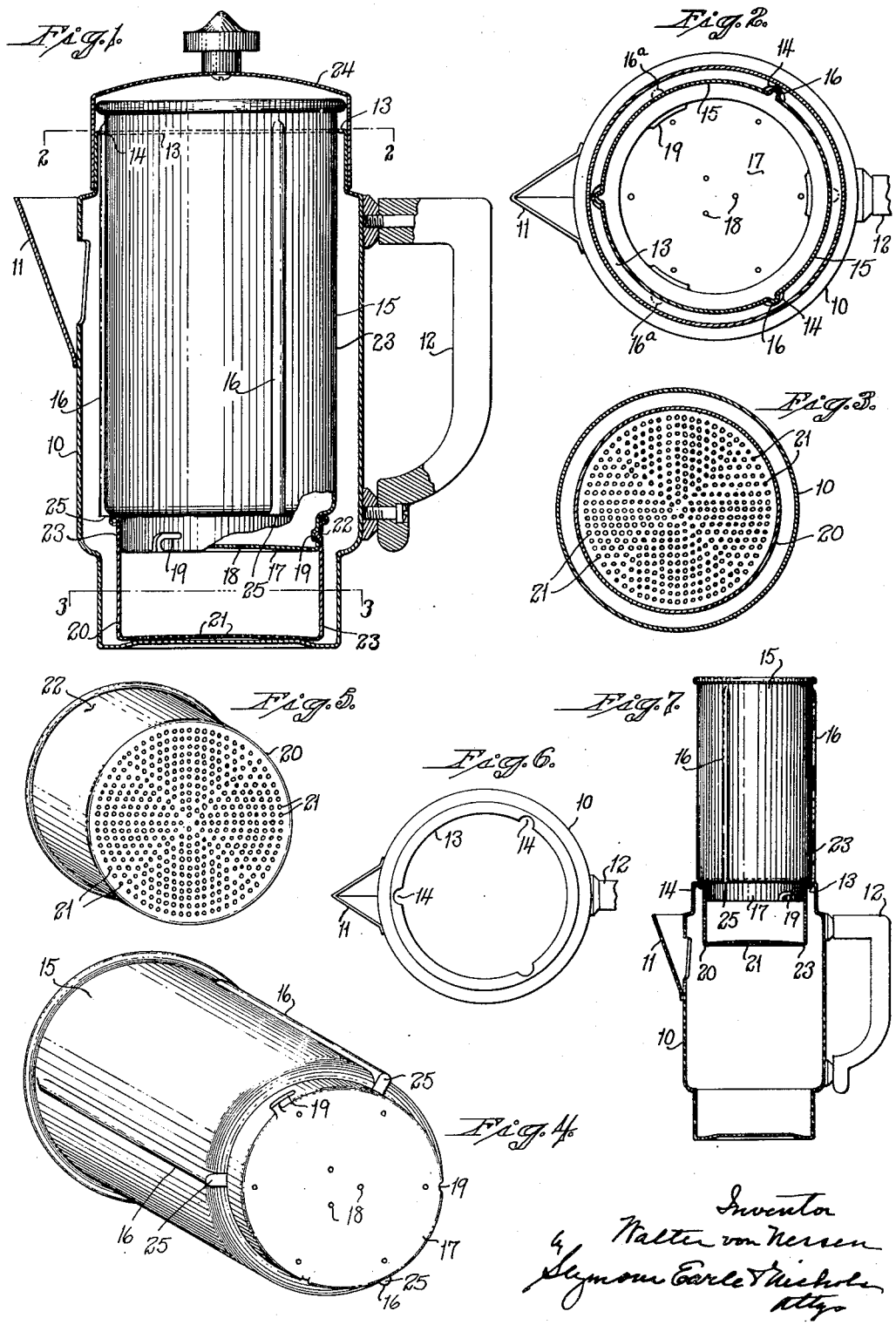

Patented Apr. 23, 1935

1,998,645

UNITED STATES PATENT OFFICE 1,998,645

DRIP COFFEEPOT

Walter von Nessen, New York, N. Y., assignor to The Chase Companies, Incorporated, Waterbury, Conn., a corporation Application March 21, 1934, Serial No. 716,613

1 Claim. (Cl. 53—3)

This invention relates to improvements in coffee pots, and more particularly to drip coffee pots.

One object of this invention is to provide an improved drip coffee pot in which the water-and-coffee unit can be housed in the pot with the cover in proper position when the coffee pot is not in use.

Another object of this invention is to provide an improved drip coffee pot in which the water-and-coffee unit can be withdrawn from the coffee pot and rested upon the upper portion thereof during the making of coffee by the drip process.

Another object of this invention is to provide an improved drip coffee pot in which the water-and-coffee unit can be entirely removed from the coffee pot, and the cover placed in proper position on the pot for serving coffee.

With the above and other objects in view, this invention includes the improved features, parts and combinations of parts disclosed in the following description, appended claim and accompanying drawing forming a part of this specification.

In the accompanying drawing, in which one way of carrying out the invention is shown for illustrative purposes:

Fig. 1 is a vertical, central, sectional view illustrating the entire coffee pot construction in assembled relation, for storing when not in use;

Fig. 2 is a transverse, sectional view on line 2—2 of Fig. 1;

Fig. 3 is a transverse, sectional view on line 3—3 of Fig. 1;

Fig. 4 is a perspective view of the water-container;

Fig. 5 is a perspective view of the coffee-container which, together with the water-container, forms a water-and-coffee unit;

Fig. 6 is a top plan view of the outer or main pot alone; and

Fig. 7 is a vertical, central, sectional view showing the water-and-coffee unit supported on the upper edge of the main pot, in the position it occupies while drip coffee is being made.

Referring to the drawing, 10 is the outer or main pot having the pouring spout 11 and handle 12. The inturned flange 13 at the top of the main pot is provided with notches or cut-out portions 14 for a purpose to be presently described.

A water-container 15 is provided with a plurality of pressed-out, longitudinally-extending ribs 16, the number and spacing thereof being such as to permit their being aligned with the notches 14, to permit the water-container 15 to be slid longitudinally into and out of the main pot.

The lower end 17 of the water-container 15 is provided with drip-holes 18 for the passage of water, and with bayonet-slots 19. A coffee-container 20 is provided with coffee-drip-holes 21 in the bottom thereof and with pressed-in lugs 22, the number and spacing of which is arranged to suit the bayonet-slots 19, so that the coffee-container 20 may be readily placed in assembled relation with the water-container 15 by means of the lugs 22 and bayonet-slots 19, in a manner that will be readily understood. Instead of using a bayonet-slot type of construction, any other suitable construction for detachably connecting the water- and coffee-containers together may be used such, for example, as a screw-thread fit, or a friction fit.

The water- and coffee-containers constitute the water-and-coffee unit 23. When the device is to be stored or shipped, the water-and-coffee unit 23 is arranged in suitable rotative position to bring the ribs 16 in alignment with the notches 14, whereupon the water-and-coffee unit will slide downward until it rests upon the bottom of the main pot 10, whereupon the cover 24 of the pot is placed in its properly-fitted position upon the main pot, all as shown in Figs. 1 and 2.

When coffee is to be made, the cover 24 and coffee-unit 23 are removed from the main pot 10, whereupon the coffee-container 20 is rotated in the proper direction to disconnect the lugs 22 from the bayonet-slots 19, whereupon the coffee-container 20 becomes separated from the water-container 15. Ground coffee is then placed in the cup-shaped coffee-container 20, whereupon the latter is connected in its assembled relation with the water-container 15 to form the water-and-coffee unit 23, which latter is then placed on the top of the main pot 10 in such rotative position, as for example, with the ribs in the position indicated in broken lines at 16ª (Fig. 2), out of line with the notches 14, thus causing the bottom-end surfaces 25 of the ribs 16 to rest upon the inturned flange 13 of the main pot 10, as shown in Fig. 7.

Hot water is now poured into the water-container 15, whereupon it drips slowly through the holes 18 onto the ground coffee in the coffee-container 20, and thence on through the holes 21 and into the bottom of the main pot 10.

After the drip process has been completed to satisfactorily make the coffee as desired, the water-and-coffee unit 23 is lifted off of the main pot 10 and placed to one side, whereupon the cover 24 will be placed in its normal proper position, as shown in Fig. 1, with the coffee pot containing the prepared coffee liquid ready for serving, and, of course, with the water-and-coffee unit 23 out of and away from the main pot 10, as has previously been described.

After the parts of the coffee pot have been cleaned, the water- and coffee-containers are again assembled to form the water-and-coffee unit 23, which is placed in the proper rotative position to permit it to bring the ribs 16 and notches 14 in alignment, whereupon the water-and-coffee unit can be slid downwardly so as to be mainly housed in the main pot 10, after which the cover 24 is placed in position, all as shown in Fig. 1.

The invention may be carried out in other specific ways than that herein set forth without departing from the spirit and essential characteristics of the invention, and the present embodiment is therefore to be considered in all respects as illustrative and not restrictive, and all changes coming within the meaning and equivalency range of the appended claim are intended to be embraced therein.

I claim:

A drip coffee pot including: a main pot having a limit flange, and a reduced upper end connected to said limit flange and provided with an inturned flange, said inturned flange being provided with one or more notches; and a water-and-coffee unit including a water-container, and a coffee-container detachably connectable to said water-container; said unit having one or more longitudinal ribs slidably interengageable with said notches in one or more rotative positions but not in certain other rotative positions, to permit said unit to alternatively be mainly housed within, or supported by and mainly above and outside of, said main pot; and a cover detachably fitting down over said upper end of said main pot and down beyond said inturned flange and adapted to properly slidably fit down over said reduced upper end and engage against said limit flange when said unit is in its mainly housed position in said main pot.

WALTER von NESSEN.